United States Patent
Follis et al.

(10) Patent No.: US 7,987,462 B2
(45) Date of Patent: Jul. 26, 2011

(54) METHOD FOR AUTOMATIC THROTTLING OF WORK PRODUCERS

(75) Inventors: David A. Follis, Hyde Park, NY (US); Michael W. Ginnick, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 1287 days.

(21) Appl. No.: 11/560,401

(22) Filed: Nov. 16, 2006

(65) Prior Publication Data

US 2008/0120622 A1 May 22, 2008

(51) Int. Cl.
*G06F 9/46* (2006.01)
(52) U.S. Cl. ........... 718/100
(58) Field of Classification Search ........... 718/100
See application file for complete search history.

(56) References Cited

U.S. PATENT DOCUMENTS

| 5,634,015 A * | 5/1997 | Chang et al. ........... 710/310 |
| 6,170,022 B1 * | 1/2001 | Linville et al. ........... 710/29 |
| 7,350,186 B2 * | 3/2008 | Coleman et al. ........... 717/103 |

FOREIGN PATENT DOCUMENTS

WO  WO0188695  11/2001

OTHER PUBLICATIONS

Ruggiero C A et al.: "Control of Parallelism in the Manchester Dataflow Machine", Lecture Notes in Computer Science, Springer Verlag, Berlin, DE, vol. 274, Sep. 14, 1987, pp. 1-15.
International Search Report, PCT/EP2007/062259, May 19, 2008.

* cited by examiner

*Primary Examiner* — Meng A An
*Assistant Examiner* — Mengyao Zhe
(74) *Attorney, Agent, or Firm* — Cantor Colburn LLP; Steven Chiu

(57) ABSTRACT

A method for automatic throttling of work producers by actively monitoring the amount and rate at which work is both produced and consumed relative to a threshold value, the consumer thread can calculate the subset of the 'N' threads which can be placed in a temporary sleep condition, wherein the duration of sleep is determined to give the consumer thread processing time to catch up, keeping the process from being overrun. 'N' is the number of unique producer threads.

14 Claims, 2 Drawing Sheets

1000

METHOD FOR AUTOMATIC THROTTLING OF WORK PRODUCERS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to actively monitoring the amount and rate at which work is both produced and consumed relative to a threshold value, and in particular to the consumer thread calculating a subset of the 'N' threads which can be placed in a temporary sleep condition, wherein the duration of sleep is determined to give the consumer thread processing time to catch up, keeping the process from being overrun. 'N' is the number of unique producer threads.

2. Description of Background

Before our invention in considering an environment in which there exists a processing systems wherein some number of threads 'N' produce work. These work requests are placed on a structure (for example, a stack).

In such a processing system there also exists a single consumer thread, which processes this work asynchronously. If all threads are dispatched relatively evenly, then it is quite possible, especially for larger values of 'N' that the consumer thread could be overrun and all available storage will be consumed with unprocessed requests.

Stopping all the producer threads until the consumer thread catches up completely stalls the entire process. As such it is more desirable to merely 'slow up' the producer threads enough to prevent the consumer thread from being overrun and compromise the processing system.

Determining a method to overcome these and other limitations gives rise to the present invention.

SUMMARY OF THE INVENTION

The shortcomings of the prior art are overcome and additional advantages are provided through the provision of a method of automatic throttling of work producer threads, the method comprising capturing, by a consumer thread, a work structure; allowing the consumer thread to determine the following: how many elements are in the work structure, a RATE-OF-THE-CONSUMER 'Rc', a RATE-OF-THE-PRODUCER 'Rp', an amount-of-work-present 'W', and a WORK-PROJECTED 'Wp' value; and throttling, selectively, by allowing the consumer thread to direct a plurality of producer threads to sleep for a SLEEP-TIME 'Sp' when the WORK-PROJECTED 'Wp' is greater than a threshold value 'T'.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which utilizes a consumer thread which calculates a subset of the 'N' threads to place in a temporary sleep condition, wherein the duration of sleep is determined to give the consumer thread processing time to catch up, keeping the process from being overrun.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
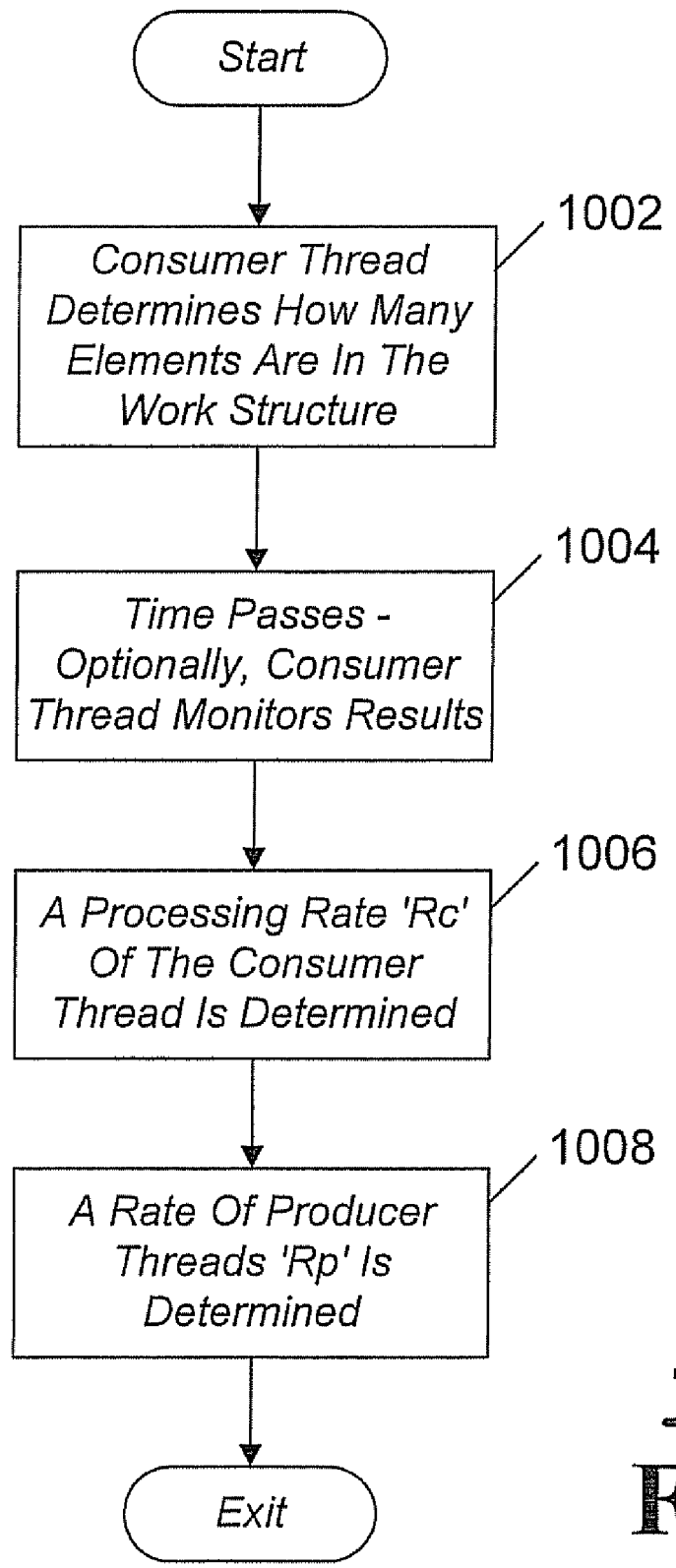
FIG. 1 illustrates one example of a method of determining the processing rates 'Rc' and 'Rp'.

Turning now to the drawings in greater detail, it will be seen that in FIG. 1 there is one example of a method of determining the processing rates 'Rc' and 'Rp'. In an exemplary embodiment 'Rc' is the rate at which the consumer thread processes work elements. This rate is continually re-determined by the consumer thread. 'Rp' is the rate at which the producer threads produce work elements. This value is calculated from the previous intervals 'W' and 'S'. 'W' is the amount of work produced in the previous interval, to be processed now as determined from the work structure. 'S' is an approximation of the amount of time the consumer thread will tale to process 'W' work elements and is calculated as 'S'='W'/'Rc'. In an exemplary embodiment a work structure can be a stack.

In an exemplary embodiment for example and not limitation, by actively monitoring the amount and rate at which work is both produced and consumed relative to a threshold value, the consumer thread can calculate the subset of the 'N' threads which can be placed in a temporary sleep condition, wherein the duration of sleep is determined to give the consumer thread processing time to catch up, keeping the process from being overrun. 'N' is the number of unique producer threads.

Referring to FIG. 1 there is illustrated one example of a method of determining the processing rates 'Rc' and 'Rp'. In an exemplary embodiment, the consumer thread will capture the entire work structure (for a stack, swapping the head-pointer with a zero) and then process the work. The consumer thread determines how many elements are in the work structure, by counter or other scheme and updates this value as elements are placed on the stack. Taking the stack of work and processing it is considered an interval. In this regard, 'W' is the number of work requests taken from the work structure for a given interval.

As time passes, the consumer thread may, by monitoring its own results, determine approximately how quickly it can process work requests—presuming work requests are, on average, about the same. So for some amount of work, 'W', it requires some amount of time to process, from which the consumer thread may derive a processing rate, in requests-per-time unit (i.e., seconds, milliseconds, etc.). This rate 'Rc' is referred to as the RATE-OF-THE-CONSUMER threads.

Similarly, since the consumer thread knows how long it took to process a given set of work and then discovers how many new work elements are present in the structure the next time it looks, it can determine an approximate rate of production of work elements. Measured in the same units as 'Rc', this value 'Rp' is referred to as the RATE-OF-THE-PRODUCER threads. The method begins in block 1002.

In block 1002 the consumer thread determines how many elements are in the work structure. Processing then moves to block 1004.

In block 1004 time passes and optionally the consumer thread monitors results. Processing then moves to block 1006.

In block 1006 a RATE-OF-THE-CONSUMER 'Rc' is determined. Processing then moves to block 1008.

In block 1008 a RATE-OF-THE-PRODUCER 'Rp' is determined. The routine is then exited.

Figure 2:
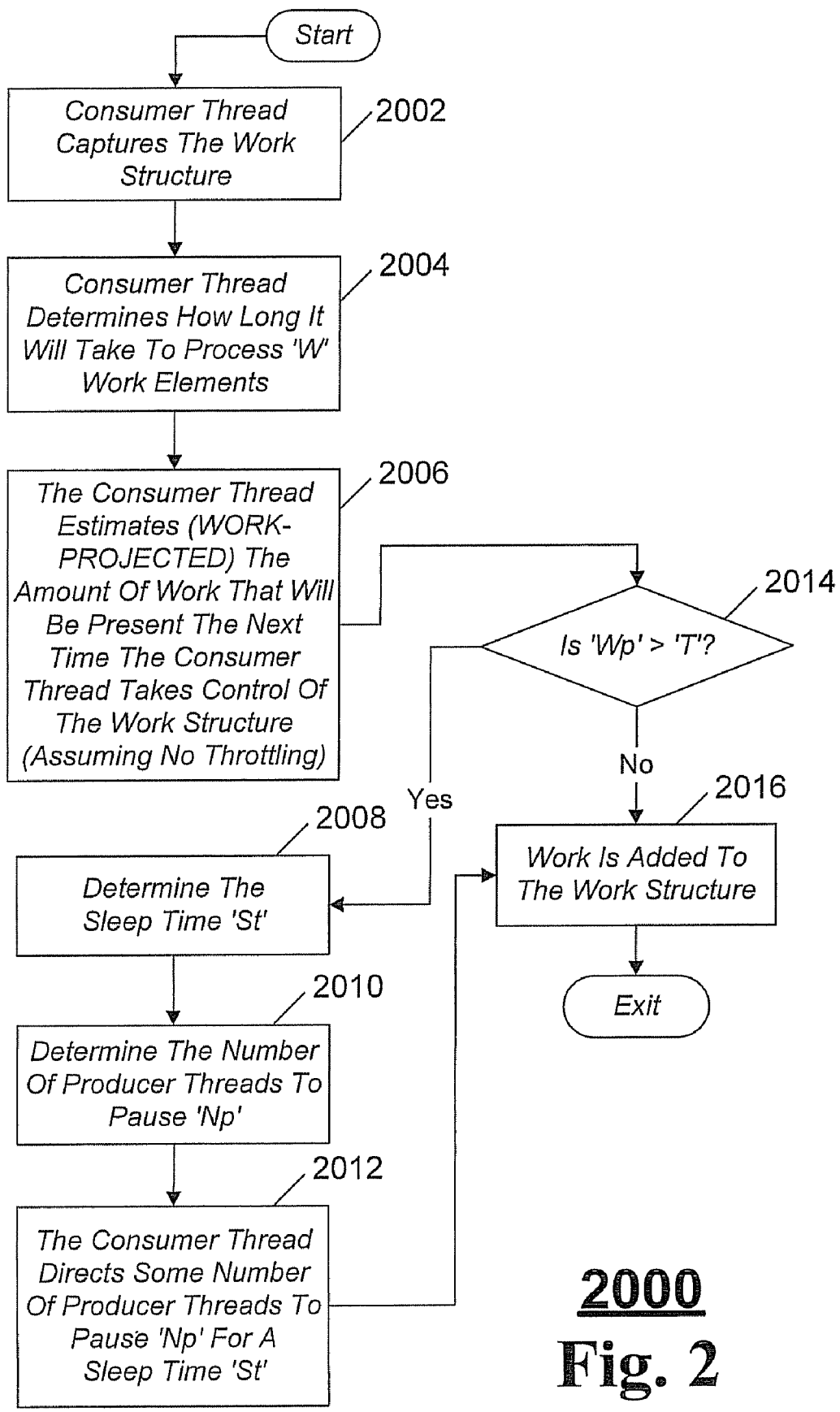
FIG. 2 illustrates one example of a method of determining and selectively throttling producer threads.

Referring to FIG. 2 there is illustrated one example of a method of determining and selectively throttling producer threads. In an exemplary embodiment for example and not limitation, suppose it happens that the production rate 'Rp' increases dramatically. When the consumer thread captures the work structure, the consumer thread discovers that the amount of work present 'W' is much larger than some predetermined threshold value 'T'. This discovery can trigger a potential throttling action. 'T' is defined as the threshold at which throttling action may be considered. In addition, in certain cases 'T' it can also be an preferable configurable value for "W". The method begins in block 2002.

In block 2002 the consumer thread captures the work structure. Processing then moves to block 2004.

In block 2004 the consumer thread determines how long it will take to process 'W' work elements. Processing then moves to block 2006.

In block 2006 the consumer thread estimates as projected-work the amount of work that will be present the next time the consumer thread takes control of the work structure (assuming no throttling).

In this regard, prior to determining if or how much to throttle, the consumer thread must first determine how long it will tale it to process 'W' work elements. In this regard, knowing 'Rc', it can divide 'W' by 'Rc' and calculate 'S', the number of time units (i.e., seconds, milliseconds, etc.) that will be approximately needed to process 'W' elements.

The consumer thread can multiply that amount of time by the rate of the producers yielding the projected amount of work that will be present the next time the consumer thread takes the work structure, presuming no throttling action is taken. By formula this can be represented as 'Wp'='S'*'Rp'. This projected amount of new work can be referred to as the WORK-PROJECTED 'Wp'.

This amount of work might be more than can be handled. To male such a determination, the consumer thread needs to determine how much work it would like to see on the queue the next time it captures the work structure. That amount of work is the previously mentioned threshold, 'T'.

Alternatively, threshold 'T' might be some defined percentage of 'Wp', in the event 'Wp' is vastly greater than 'T', or it might also be desirable to have it be some percentage of an upper threshold limit, attempting to get the work volume down below a comfortable threshold level.

In this exemplary embodiment for example and not limitation, if 'Wp'>'T', then it is projected that, because of the amount of time required to process a volume of work over our threshold, that the next time the consumer thread captures the work structure processing will be faced with an amount of work over the threshold. Action to minimize this condition is thus warranted.

It should be noted that when 'Wp'>'T', that it is likely because the current 'Rp' is greater than it has historically been. It should then also be considered that the 'Rp' calculated for the next interval might also be greater than this one, and thus 'Wp' might, if we tale no action, be even larger than the present value. Processing then moves to decision block 2014.

In decision block 2014 a determination is made as to whether or not 'Wp'>'T'. If the resultant is in the affirmative that is 'Wp' greater than 'T' then processing moves to block 2008. If the resultant is in the negative that is 'Wp' less than or equal to 'T' then processing moves to block 2016.

In block 2008 'St' the SLEEP-TIME is determined. In an exemplary embodiment, 'St' is the same 'S' where 'S' is an approximation of the amount of time the consumer thread will take to process 'W' work elements and is calculates as 'S'='W'/'Rc'. Processing then moves to block 2010.

In block 2010, presumption now is that the consumer thread has the possibility of interfering with the producer threads as they place work in the work structure. In this regard, the consumer thread may intervene and take action to minimize the workflow conflict by directing some number, 'Np' NUMBER-OF-PRODUCER-THREADS-PAUSED, to pause for some amount of time 'St' SLEEP-TIME. 'Np' can be referred to as the NUMBER-OF-PRODUCER-THREADS-PAUSED. 'St' can be referred to as the amount of time to pause 'Np' threads also referred to as the SLEEP-TIME.

In an exemplary embodiment, to determine the number of threads to pause, 'Np', first divide the ideal amount of work to produce 'T' (threshold) with the amount work expected to be produced 'Wp' with that result multiplied by the number of existing producer threads 'N'. This result is the number of threads needed, so subtracting the result from N determines the number of threads to pause. By formula the NUMBER-OF-PRODUCE -THREADS-PAUSED can be expressed as 'Np'='N'-('T'/'Wp')*'N'.

Thus when 'Np' producer threads attempt to place work in the work structure, they will pause for 'St' time units (i.e., seconds, milliseconds, etc.). If the rate of production remains the same, then the amount of work produced for the next interval should be approximately the threshold value 'T'. Processing then moves to block 2012.

In block 2012 the consumer thread directs some number, 'Np' NUMBER-OF-PRODUCER-THREADS-PAUSED, to pause for some amount of time 'St' SLEEP-TIME. Processing then moves to block 2014.

In block 2016, work can be added to the work structure. The routine is then exited.

In an exemplary embodiment for example and not limitation, if the rate of production 'Rp' increases, then even with a reduced number of threads, the amount of work present in the next interval may exceed the threshold, 'T'. In this event, throttling of the producer threads will occur again.

Thus in general the amount of work present at each interval should ideally not exceed the threshold for a significant period of time, or exceed it by dangerous amounts.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of automatic throttling of work producer threads, said method comprising:
   capturing, by a consumer thread, a work structure;
   allowing said consumer thread to determine how many elements are in said work structure, a RATE-OF-THE-CONSUMER 'Rc', a RATE-OF-THE-PRODUCER 'Rp', an amount-of-work-present 'W', and a WORK-PROJECTED 'Wp' value; and
   throttling, selectively, by allowing said consumer thread to direct a plurality of producer threads to sleep for a SLEEP-TIME 'Sp' when said WORK-PROJECTED 'Wp' is greater than a threshold value 'T';
   wherein the number of said plurality of producer threads directed to sleep by said consumer thread is calculated by formula as NUMBER-OF-PRODUCER-THREADS-PAUSED 'Np'='N'−('T'/'Wp')*'N', where N is a number of unique producer threads.

2. The method in accordance with claim 1, wherein said work structure is a stack.

3. The method in accordance with claim 1, wherein said WORK-PROJECTED is calculated by formula as 'Wp'='S'*'Rp'.

4. The method in accordance with claim 3, wherein 'S' is an approximation of the amount of time said consumer thread will take to process said amount-of-work-present 'W' and is calculated by formula as 'S'='W'/'Rc'.

5. The method in accordance with claim 1, wherein said plurality of producer threads is a subset of a producer threads population.

6. The method in accordance with claim 1, wherein said plurality of producer threads is a subset of a producer threads population without preference being given to any specific said plurality of producer threads 'Np' selected.

7. The method in accordance with claim 1, wherein said SLEEP-TIME is calculated by formula as 'Sp'='S'.

8. The method in accordance with claim 7, wherein 'S' is an approximation of the amount of time said consumer thread will take to process said amount-of-work-present 'W' and is calculated by formula as 'S'='W'/'Rc'.

9. The method in accordance with claim 1, further comprising:
   allowing said consumer thread, to estimate as work projected the amount of work that will be present the next time said consumer thread captures said work structure.

10. A method of automatic throttling of work producer threads, said method comprising:
    capturing, by a consumer thread, a work structure;
    allowing said consumer thread to determine how many elements are in said work structure, a RATE-OF-THE-CONSUMER 'Rc', a RATE-OF-THE-PRODUCER 'Rp'; and
    allowing said consumer thread, to estimate as work projected the amount of work that will be present the next time said consumer thread captures said work structure;
    allowing said consumer thread to determine an amount-of-work-present 'W', and a WORK-PROJECTED 'Wp' value; and
    throttling, selectively by allowing said consumer thread to direct a plurality of producer threads to sleep for a SLEEP-TIME 'Sp' when said WORK-PROJECTED 'Wp' is greater than a threshold value 'T';
    wherein said WORK-PROJECTED is calculated by formula as 'Wp'='S'*'Rp';
    wherein 'S' is an approximation of the amount of time said consumer thread will take to process said amount-of-work-present 'W' and is calculated by formula as 'S'='W'/'Rc';
    wherein the number of said plurality of producer threads directed to sleep by said consumer thread is calculated by formula as NUMBER-OF-PRODUCER-THREADS-PAUSED 'Np'='N'−('T'/'Wp')*'N', where N is a number of unique producer threads.

11. The method in accordance with claim 10, wherein said plurality of producer threads is a subset of a producer threads population without preference being given to any specific said producer threads selected.

12. The method in accordance with claim 11, wherein said SLEEP-TIME is calculated by formula as 'Sp'='S'.

13. The method in accordance with claim 12, wherein 'S' is an approximation of the amount of time said consumer thread will take to process said amount-of-work-present 'W' and is calculated by formula as 'S'='W'/'Rc'.

14. A method of automatic throttling of work producer threads, said method comprising:
    capturing, by a consumer thread, a work structure;
    allowing said consumer thread to determine how many elements are in said work structure, a RATE-OF-THE-CONSUMER 'Rc', a RATE-OF-THE-PRODUCER 'Rp', an amount-of-work-present 'W', and a WORK-PROJECTED 'Wp' value; and
    throttling, selectively by allowing said consumer thread to direct a plurality of producer threads to sleep for a SLEEP-TIME 'Sp' when said WORK-PROJECTED 'Wp' is greater than a threshold value 'T'; and
    allowing said consumer thread, to estimate as work projected the amount of work that will be present the next time said consumer thread captures said work structure;
    wherein said WORK-PROJECTED is calculated by formula as 'Wp'='S'*'Rp', 'S' is an approximation of the amount of time said consumer thread will take to process said amount-of-work-present 'W' and is calculated by formula as 'S'='W'/'Rc', the number of said plurality of producer threads directed to sleep by said consumer thread is calculated by formula as NUMBER-OF-PRODUCER-THREADS-PAUSED 'Np'='N'−('T'/'Wp')*'N', where N is a number of unique producer threads, said SLEEP-TIME is calculated by formula as 'Sp'='S'.

* * * * *